(12) United States Patent
Abe

(10) Patent No.: US 10,557,063 B2
(45) Date of Patent: Feb. 11, 2020

(54) DOUBLE-SIDED BLACK ADHESIVE TAPE

(71) Applicant: Dexerials Corporation, Tokyo (JP)

(72) Inventor: Tomoyuki Abe, Tokyo (JP)

(73) Assignee: Dexerials Corporation, Tokyo (JP)

(*) Notice: Subject to any disclaimer, the term of this patent is extended or adjusted under 35 U.S.C. 154(b) by 92 days.

(21) Appl. No.: 15/123,591

(22) PCT Filed: Mar. 3, 2015

(86) PCT No.: PCT/JP2015/056259
§ 371 (c)(1),
(2) Date: Sep. 2, 2016

(87) PCT Pub. No.: WO2015/133497
PCT Pub. Date: Sep. 11, 2015

(65) Prior Publication Data
US 2017/0081564 A1    Mar. 23, 2017

(30) Foreign Application Priority Data

Mar. 5, 2014 (JP) .................................. 2014-042642
Mar. 3, 2015 (JP) .................................. 2015-041048

(51) Int. Cl.
*C09J 133/06*    (2006.01)
*C09J 11/04*    (2006.01)
*C08K 3/04*    (2006.01)

(52) U.S. Cl.
CPC ........... *C09J 133/062* (2013.01); *C09J 11/04* (2013.01); *C08K 3/04* (2013.01); *C09J 2203/318* (2013.01); *C09J 2205/102* (2013.01); *C09J 2205/11* (2013.01)

(58) Field of Classification Search
None
See application file for complete search history.

(56) References Cited

U.S. PATENT DOCUMENTS

| 4,612,242 A * | 9/1986 | Vesley | C09J 7/38 428/313.9 |
| 4,666,771 A | 5/1987 | Vesley et al. | |
| 4,748,061 A | 5/1988 | Vesley | |
| 4,780,491 A | 10/1988 | Vesley et al. | |
| 4,950,537 A | 8/1990 | Vesley et al. | |
| 5,246,780 A | 9/1993 | Farer et al. | |
| 2004/0186201 A1 | 9/2004 | Stoffer et al. | |
| 2004/0249023 A1 | 12/2004 | Stoffer et al. | |
| 2004/0249043 A1 | 12/2004 | Stoffer et al. | |
| 2011/0257273 A1* | 10/2011 | Yabuuchi | C08G 18/4063 514/772.3 |
| 2013/0101819 A1 | 4/2013 | Suzuki et al. | |
| 2014/0044915 A1 | 2/2014 | Niwa et al. | |
| 2015/0228498 A1* | 8/2015 | Hattori | G03F 7/0002 257/618 |

FOREIGN PATENT DOCUMENTS

| CN | 102234369 A | 11/2011 | |
| EP | 0324242 A2 * | 7/1989 | ............... C08K 9/12 |
| JP | S61-272251 A | 12/1986 | |
| JP | 63-241087 A | 10/1988 | |
| JP | H1-217092 | 8/1989 | |
| JP | H02-248483 | 10/1990 | |
| JP | H06-510057 | 11/1994 | |
| JP | H6-346040 A | 12/1994 | |
| JP | 2003-049144 A | 2/2003 | |
| JP | 2006-516300 A | 6/2006 | |
| JP | 2007-333885 A | 12/2007 | |
| JP | 2009-108314 A | 5/2009 | |
| JP | 2013-100465 A | 5/2013 | |
| TW | 201408752 A | 3/2014 | |
| WO | 2014123034 A1 | 8/2014 | |

OTHER PUBLICATIONS

International Search Report and Written Opinion for PCT App No. PCT/JP2015/056259 dated May 19, 2015, 18 pgs.
Office Action for Taiwanese Patent Application No. 104107003, dated Oct. 17, 2017; 77 pages. English translation provided.
Office Action from related Taiwanese Patent Application No. 104107003, dated May 28, 2018; English translation provided; 17 pages.

* cited by examiner

*Primary Examiner* — Scott R. Walshon
*Assistant Examiner* — Elaine M Vazquez
(74) *Attorney, Agent, or Firm* — Procopio, Cory, Hargreaves & Savitch LLP

(57) ABSTRACT

A double-sided black adhesive tape having a hollow particle-containing adhesive agent layer, wherein a surface of the hollow particle is subjected to a black pigment adhesion treatment.

14 Claims, No Drawings

DOUBLE-SIDED BLACK ADHESIVE TAPE

CROSS-REFERENCE TO RELATED APPLICATIONS

This application is a U.S. National Stage entry of PCT Application No. PCT/JP2015/056259, filed on Mar. 3, 2015, which claims priority to JP Application No. 2014-042642, filed Mar. 5, 2014 and JP Application No. 2015-041048, filed Mar. 3, 2015. The contents of the foregoing are incorporated by reference.

TECHNICAL FIELD

The present invention relates to a double-sided black adhesive tape which can be preferably used in the case where a transparent protective front panel is pasted on an image display nodule of portable information terminal, for example, a smart phone.

BACKGROUND ART

The portable information terminal has a structure in which an image display module including a housing and a transparent front panel, for example, a glass plate or an acryl plate are pasted with a double-sided adhesive tape which is disposed on the outer peripheral edges thereof opposed to each other. Here, it is required for such a double-sided adhesive tape to exhibit good impact resistance. Thus, as a double-sided adhesive tape which considers the impact resistance, there is proposed a double-sided adhesive tape in which on both sides of a foam substrate, adhesive agent layers obtained by photocuring a photocurable type acrylic adhesive agent composition are laminated (Patent Document 1). However, since the double-sided adhesive tape has a disadvantage in that a part of bubbles in the foam substrate used is open-celled, it has a problem that waterproof is reduced. Therefore, in order to achieve both the impact resistance and the waterproof, it is considered that fine hollow particles are blended in the acrylic adhesive agent layer of the double-sided adhesive tape.

PRIOR ART DOCUMENT

Patent Document

Patent Document 1: JP-A-2009-108314

SUMMARY OF THE INVENTION

Problems that the Invention is to Solve

By the way, it is required for a double-sided adhesive tape for pasting an image display module including a housing and a front panel to be black in relation to providing a black frame-shape printing layer on the front panel. Therefore, it has been usually attempted to knead carbon black, as a black coloring agent, in the photocurable type acrylic adhesive agent composition containing hollow particles.

However, since fine hollow particles have a strong light diffusion property, when such hollow particles are blended in a photocurable type acrylic adhesive agent composition, the adhesive agent composition is whitened so that there is a problem that it is difficult to sufficiently blacken an acrylic adhesive agent layer formed from the adhesive agent composition, even when carbon black is mixed in the adhesive agent composition. Moreover, when the photocurable type acrylic adhesive agent composition is irradiated with ultraviolet ray, since carbon black absorbs the ultraviolet ray, there is a problem that it is difficult to sufficiently cure a curable component of the photocurable type acrylic adhesive agent composition.

An object of the present invention is to solve the problems in the prior art described above and to be able to be blacken an acrylic adhesive agent layer so as to enable sufficient photocuring in a double-sided adhesive tape having the acrylic adhesive agent layers obtained by photocuring a photocurable type acrylic adhesive agent composition containing hollow particles, without impairing the impact resistance and the waterproof.

Means for Solving the Problems

The present inventor has presumed that when hollow particles and black pigment are separately contained in a photocurable type acrylic adhesive agent composition, the light diffusion capability of the hollow particle is maintained to some extent and the photocuring of the adhesive agent composition is apt to become insufficient because the black pigment is dispersed in the whole photocurable type acrylic adhesive agent composition. Based on the presumption, the inventor has found that when hollow particles which have been previously subjected to a black pigment adhesion treatment on the surface thereof is contained in the photocurable type acrylic adhesive agent composition, the light diffusion capability of the hollow particle is greatly suppressed, the photocurable type acrylic adhesive agent composition can be sufficiently blackened, and, nevertheless, the photocurable type acrylic adhesive agent composition can be sufficiently photocured because the dispersion amount of the black pigment in the photocurable type acrylic component is suppressed, thereby completing the invention.

That is, the present invention relates to the items described in [1] to [19] shown below.

[1]

A double-sided black adhesive tape having a hollow particle-containing adhesive agent layer, wherein a surface of the hollow particle is subjected to a black pigment adhesion treatment.

[2]

The double-sided black adhesive tape as recited in [1], wherein an average particle diameter of the hollow particle is from 20 to 40 μm, and an average particle diameter of the black pigment is from 10 to 30 nm.

[3]

The double-sided black adhesive tape as recited in [1] or [2], wherein the hollow particle is a polyacrylonitrile hollow particle.

[4]

The double-sided black adhesive tape as recited in any one of [1] to [3], wherein the black pigment is carbon black.

[5]

The double-sided black adhesive tape as recited in any one of [1] to [4], wherein a content of the hollow particle in the hollow particle-containing adhesive agent layer is from 20 to 40% by volume.

[6]

The double-sided black adhesive tape as recited in any one of [1] to [5], wherein the hollow particle-containing adhesive agent layer further contains a black resin particle including a black pigment in an amount of 1 to 8% by volume.

[7]

The double-sided black adhesive tape as recited in any one of [1] to [6], wherein the hollow particle-containing adhesive agent layer is a layer obtained by forming a layer from a hollow particle-containing adhesive agent composition containing a photocurable type acrylic adhesive agent composition containing (a) a monofunctional (meth)acrylate, (b) (meth)acrylic acid, (c) an acrylic crosslinking agent and (d) a photo-radical polymerization initiator, and a hollow particle a surface of which is subjected to a black pigment adhesion treatment, and photopolymerizing the layer.

[8]

The double-sided black adhesive tape as recited in [7], wherein the monofunctional (meth)acrylate (a) is at least one selected from the group consisting of 2-ethylhexyl acrylate, butyl acrylate, isooctyl acrylate, isostearyl acrylate and ethyl carbitol acrylate, the (meth)acrylic acid (b) is acrylic acid or methacrylic acid, the acrylic crosslinking agent (c) is at least one selected from the group consisting of neopentyl glycol di(meth)acrylate, hydroxypivalic acid neopentyl glycol di(meth)acrylate, polypropylene glycol di(meth)acrylate, nonanediol di(meth)acrylate, 1,4-butanediol di(meth)acrylate, polyethylene glycol di (meth) acrylate and EO-modified polypropylene glycol di(meth)acrylate, and the photo-radical polymerization initiator (d) is at least one selected from the group consisting of an oxime ester photopolymerization initiator, an acylphosphine oxide photopolymerization initiator and an alkyl phenone photopolymerization initiator.

[9]

The double-sided black adhesive tape as recited in [8], wherein the photocurable type acrylic adhesive agent composition contains from 2 to 20 parts by mass of the (meth) acrylic acid (b), from 0.1 to 1.0 part by mass of the acrylic crosslinking agent (c) and from 0.1 to 1.0 part by mass of the photo-radical polymerization initiator (d), based on 100 parts by mass of the monofunctional (meth)acrylate (a).

[10]

The double-sided black adhesive tape as recited in [8] or [9], wherein the photo-radical polymerization initiator (d) includes the oxime ester photopolymerization initiator, the acylphosphine oxide photopolymerization initiator and the alkyl phenone photopolymerization initiator in a ratio of (0.1 to 4):(0.1 to 2):(1 to 8) on a weight basis.

[11]

The double-sided black adhesive tape as recited in any one of [1] to [10], wherein a layer thickness of the hollow particle-containing adhesive agent layer is from 60 to 140 μm.

[12]

The double-sided black adhesive tape as recited in any one of [1] to [11], wherein on one side or both sides of the hollow particle-containing adhesive agent layer is provided a hollow particle-free adhesive agent, layer obtained by forming a layer from a photocurable type hollow particle-free adhesive agent composition containing a photocurable type acrylic adhesive agent composition containing (aa) a monofunctional (meth) acrylate, (bb) (meth)acrylic acid, (cc) an acrylic crosslinking agent and (dd) a photo-radical polymerization initiator, and photopolymerizing the layer,

[13]

The double-sided black adhesive tape as recited in [12], wherein the monofunctional (meth)acrylate (aa) is at least one selected from the group consisting of 2-ethylhexyl acrylate, butyl acrylate, isooctyl acrylate, isostearyl acrylate and ethyl carbitol acrylate, the (meth)acrylic acid (bb) is acrylic acid or methacrylic acid, the acrylic crosslinking agent (cc) is at least one selected from the group consisting of neopentyl glycol di(meth)acrylate, hydroxypivalic acid neopentyl glycol di(meth)acrylate, polypropylene glycol di(meth)acrylate, nonansdiol di(meth) acrylate, 1,4-butanediol di(meth) acrylate, polyethylene glycol di(meth)acrylate and EO-modified polypropylene glycol di(meth)acrylate, and the photo-radical polymerization initiator (dd) is at least one selected from the group consisting of an oxime ester photopolymerization initiator, an acylphosphine oxide photopolymerization initiator and an alkyl phenone photopolymerization initiator.

[14]

The double-sided black adhesive tape as recited in [11] or [12], wherein the hollow particle-free adhesive agent composition contains from 2 to 20 parts by mass of the (meth) acrylic acid (bb), from 0.1 to 1.0 part by mass of the acrylic crosslinking agent (cc) and from 0.1 to 1.0 part by mass of the photo-radical polymerization initiator (dd), based on 100 parts by mass of the monofunctional (meth)acrylate (aa).

[15]

The double-sided black adhesive tape as recited in [13] or [14], wherein the photo-radical polymerization initiator (dd) includes the oxime ester photopolymerization initiator, the acylphosphine oxide photopolymerization initiator and the alkyl phenone photopolymerization initiator in a ratio of (0.1 to 4):(0.1 to 2):(0.4 to 8) on a weight basis.

[16]

The double-sided black adhesive tape as recited in any one of [12] to [14], wherein a layer thickness of the hollow particle-free adhesive agent layer is from 10 to 60 μm.

[17]

A production method of a double-sided black adhesive tape having a hollow particle-containing adhesive agent layer including steps shown below:

(Step A) step of performing a black pigment adhesion treatment on a surface of a hollow particle;

(Step B) step of forming a layer from a hollow particle-containing adhesive agent composition containing a photocurable type acrylic adhesive agent composition containing (a) a monofunctional (meth)acrylate, (b) (meth)acrylic acid, (c) an acrylic crosslinking agent and (d) a photo-radical polymerization initiator, and the hollow particle a surface of which is subjected to the black pigment adhesion treatment obtained in step A to form a hollow particle-containing adhesive agent composition layer; and (Step C) step of photocuring the hollow particle-containing adhesive agent composition layer formed in step B to from a hollow particle-containing adhesive agent layer.

[18]

The production method as recited in [17], wherein the black pigment adhesion treatment in step A comprises mixing the hollow particle and the black pigment using a jar mill.

[19]

An information mobile terminal in which an image display-module and a front panel are pasted through a double-sided black adhesive tape on outer peripheral edges thereof opposed to each other, wherein the double-sided black adhesive tape is the double-sided black adhesive tape as recited in any one of [1] to [16].

Advantage of the Invention

The double-sided black adhesive tape of the invention contains hollow particles in an adhesive agent layer. Therefore, the double-sided black adhesive tape has good waterproof and impact resistance. Moreover, the hollow particle is subjected to a black pigment adhesion treatment on the surface thereof. Therefore, the light diffusion capability of the hollow particle is greatly suppressed, the photocurable type acrylic resin composition can be sufficiently blackened, and since the black pigment is not uniformly dispersed in the photocurable type acrylic resin composition, the photocurable type acrylic resin composition can be sufficiently photocured.

MODE FOR CARRYING OUT THE INVENTION

The invention is specifically described along with the items shown below.
1. Double-Sided Black Adhesive Tape
    (1) Hollow particle-containing adhesive agent layer
    (2) Hollow particle
    (3) Black pigment
    (4) Photocurable type acrylic adhesive agent composition
    (5) Component (a): Monofunctional (meth)acrylate
    (6) Component (b): (Meth)acrylic acid
    (7) Component (c): Acrylic crosslinking agent
    (8) Component (d): Photo-radical polymerization initiator
    (9) Black pigment-including resin particle
    (10) Layer thickness of hollow particle-containing adhesive agent layer
2. Other Embodiments of Double-Sided Black Adhesive Tape
    (11) Hollow particle-free adhesive agent layer
    (12) Layer thickness of hollow particle-free adhesive agent layer
3. Production Method of Double-Sided Black Adhesive Tape
    (13) Step A
    (14) Step B
    (15) Step C
4. Information Mobile Terminal
1. Double-Sided Black Adhesive Tape The double-sided black adhesive tape of the invention has a hollow particle-containing adhesive agent layer. The term "double-sided" as used herein means that both a surface and a back surface exhibit tackiness. The term "black" means that adhesive tape applied to an adherend surface exhibits black. The degree of black may vary depending on blackness which is required in the application of the double-sided black adhesive tape, and is preferably 1.5 or more in reflection density of ISO5-4 (Macbeth density).

(1) Hollow Particle-Containing Adhesive Agent Layer

The hollow particle-containing adhesive agent layer constituting the double-sided black adhesive tape of the invention is a layer formed by dispersing hollow particles in a photocurable type acrylic adhesive agent composition, forming a layer and photocuring the layer with ultraviolet ray irradiation.

The content of the hollow particle in the hollow particle-containing adhesive agent layer is preferably from 20 to 40% by volume, and more preferably from 25 to 35% by volume. In the range described above, the sufficient impact resistance is obtained and the strength of the adhesive agent is not impaired.

As to the dispersion method of hollow particles, the layer forming method and the photocuring method, arbitrary methods can be adopted as long as the effects of the invention are not impaired. For example, as the dispersion method, a stirrer, for example, a mixer or a dissolver can be adopted. The layer forming method is not particularly limited and, for example, a method of coating the acrylic adhesive agent composition on an appropriate support, for example, a release film, by using a roll coater or a bar coater can be adopted. Moreover, as the photocuring method, a method of irradiating ultraviolet ray can be adopted.

(2) Hollow Particle

The hollow particle constituting the hollow particle-containing adhesive agent layer is a hollow particle a surface of which is subjected to a black pigment adhesion treatment. The black pigment adhesion treatment as used herein means a treatment for adhering a black pigment to a surface of the hollow particle, and arbitrary methods can be adopted as long as the effects of the invention are not impaired. For example, mixing of the hollow particle and the black pigment using a jar mill or a mixer is exemplified. A method of mixing the hollow particle and the black pigment using a jar mill is preferably exemplified in view of balance between simplicity of the treatment operation and high efficiency of the black pigment adhesion treatment.

The hollow particle having an average particle diameter of 20 to 40 μm can be preferably used. This is because that in the range described above, the sufficient impact resistance is obtained without impairing the strength of the adhesive agent. The measurement of the average particle diameter can be performed, for example, by using a laser light scattering particle size distribution measuring apparatus.

From the standpoint of material, the hollow particle can be appropriately determined from known hollow particles, for example, an inorganic hollow particle, for example, glass or ceramics or an organic hollow particle, for example, polyacrylonitrile, polyethylene or polystyrene, depending on the intended use or the like of the double-sided black adhesive tape. Among them, polyacrylonitrile hollow particle is preferably used from the standpoint of impact absorption property.

(3) Black Pigment

The black pigment can be appropriately selected from known inorganic black pigments and organic black pigments depending on the intended use or the like of the double-sided black adhesive tape. Among them, carbon black which is an inorganic black pigment is preferably used from the standpoint of versatility and cost.

The average particle diameter of the black pigment is preferably from 10 to 30 nm, and more preferably from 15 to 25 nm. This is because that in the range described above, the adhesive property to the resin is good and aggregation is small. The measurement of the average particle diameter can also be performed, for example, by using a laser light scattering particle size distribution measuring apparatus.

(4) Photocurable Type Acrylic Adhesive Agent Composition

The hollow particle-containing adhesive agent layer constituting the hollow particle-containing adhesive agent layer of the invention is formed from a photocurable type acrylic adhesive agent composition. The photocurable type acrylic adhesive agent composition contains component (a): a monofunctional (meth)acrylate, component (b): (meth)acrylic acid, component (c): an acrylic crosslinking agent and component (a): a photo-radical polymerization initiator. The term "(meth) acrylate" as used herein is a term which includes acrylate and methacrylate.

A preferred blending ratio of these components is from 2 to 20 parts by mass of component (b): (meth)acrylic acid, from 0.1 to 1.0 part by mass of component (C): an acrylic crosslinking agent and from 0.1 to 1.0 part by mass of component (d): a photo-radical polymerization initiator, based on 100 parts by mass of component (a): a monofunctional (meth)acrylate. A more preferred blending ratio is from 4 to 10 parts by mass of component (b): (meth)acrylic acid, from 0.2 to 0.5 parts by mass of component (C): an acrylic crosslinking agent and from 0.2 to 0.6 parts by mass of component (d): a photo-radical polymerization initiator, based on 100 parts by mass of component (a): a monofunctional (meth)acrylate.

(5) Component (a): Monofunctional (meth)acrylate

The monofunctional (meth)acrylate of component (a) is a photopolymerizable monomer as a basis of the polymer, and arbitrary monofunctional (meth)acrylates can be used. Preferably, at least one selected from the group consisting of 2-ethylhexyl acrylate, butyl acrylate, isooctyl acrylate, isostearyl acrylate and ethyl carbitol acrylate is used from the standpoint of versatility and low glass transition point (Tg).

(6) Component (b): (Meth)acrylic Acid

The (meth)acrylic acid of component (b) is a monomer for imparting heat resistance and a cohesive force to the polymer, and it is acrylic acid or methacrylic acid.

(7) Component (c): Acrylic Crosslinking Agent

The acrylic crosslinking agent of component (c) is a monomer for imparting curability not to cause heat melt, and known acrylic crosslinking agents can be used. It is preferably a polyfunctional (meth) acrylate having two or more acryloyl groups or methacryloyl groups in the molecule. Specifically, at least one selected from the group consisting of neopentyl glycol di(meth)acrylate, hydroxypivalic acid neopentyl glycol di(meth)acrylate, polypropylene glycol di(meth)acrylate, nonanediol di(meth)acrylate, 1,4-butanediol di(meth)acrylate, polyethylene glycol di(meth)acrylate and EO-modified polypropylene glycol di(meth)acrylate is used.

(8) Component (d): Photo-radical Polymerization Initiator

The photo-radical polymerization initiator of component (d) is a compound for an active species source required for performing photopolymerization of components (a) to (c), and known photo-radical polymerization initiators can be used as far as the effects of the invention are not impaired. Preferably, at least one photopolymerization initiator selected from the group consisting of an oxime ester photopolymerization initiator, an acylphosphine oxide photopolymerization initiator and an alkyl phenone photopolymerization initiator can be used. Among them, it is preferred to use these three species together at the same time from the standpoint of curability. In the case of using these three species together at the same time, the oxime ester photopolymerization initiator, the acylphosphine oxide photopolymerization initiator and the alkyl phenone photopolymerization initiator are used preferably in a ratio of (0.1 to 4):(0.1 to 2.0):(0.4 to 8), more preferably in a ratio of (0.1 to 4):(0.1 to 2.0):(1 to 8), still more preferably in a ratio of (0.2 to 2):(0.5 to 1.5):(3 to 6), on a weight basis. In the range of the ratio of photopolymerization initiators described above, curing to black proceeds sufficiently and it is possible to cure without significant reduction of the molecular weight.

(9) Black Pigment-Including Resin Particle

The hollow particle-containing adhesive agent layer can contain a black pigment-including resin particle which includes a black pigment in order to further increase the blackness. In this case, the hollow particle-containing adhesive agent layer can contain preferably the black pigment-including resin particle in an amount of 1 to 8% by volume, and more preferably in an amount of 2 to 4% by volume.

The black pigment-including resin particle can be obtained by mixing a known acrylic monomer, a known photopolymerization initiator and a black pigment having a volume average particle diameter of 1 to 20 µm so as to be set an amount of the black pigment to 0.25 to 1.0% by mass, subjecting the resulting mixture to a known suspension photopolymerization, and isolating and drying by a known method.

(10) Layer Thickness of Hollow Particle-Containing Adhesive Agent Layer

The layer thickness of the hollow particle-containing adhesive agent layer is preferably from 60 to 140 µm, and more preferably from 80 to 120 nm. This is because that in the range described above, the sufficient blackness and impact resistance are obtained.

2. Other Embodiments of Double-Sided Black Adhesive Tape

The double-sided black adhesive tape of the invention may have a hollow particle-free adhesive agent layer on one side or both sides of the hollow particle-containing adhesive agent, layer in order to fix components. It is preferred to provide the hollow particle-free adhesive agent layers on the both sides from the standpoint of strong adhesiveness.

(11) Hollow Particle-Free Adhesive Agent Layer

The hollow particle-free adhesive agent layer is preferably a layer formed by forming a layer from a photocurable type hollow particle-free adhesive agent composition and irradiating the layer with ultraviolet ray. As such a hollow particle-free adhesive agent composition, a composition containing component (aa): a monofunctional (meth)acrylate, component (bb): (meth)acrylic acid, component (cc): an acrylic crosslinking agent and component (dd): a photo-radical polymerization initiator is preferably exemplified.

A preferred blending ratio of these components is from 2 to 20 parts by mass of component (bb); (meth)acrylic acid, from 0.1 to 1.0 part by mass of component (cc): an acrylic crosslinking agent and from 0.1 to 1.0 part by mass of component (dd): a photo-radical polymerization initiator, based on 100 parts by mass of component (aa); a monofunctional (meth)acrylate. A more preferred blending ratio is from 4 to 10 parts by mass of component (bb): (meth) acrylic acid, from 0.2 to 0.5 parts by mass of component (cc): an acrylic crosslinking agent and from 0.2 to 0.6 parts by mass of component (dd): a photo-radical polymerization initiator, based on 100 parts by mass of component (aa): a monofunctional (meth)acrylate.

The component (aa): a monofunctional (meth)acrylate, the component (bb): (meth) acrylic acid, the component, (cc): an acrylic crosslinking agent and the component (dd): a photo-radical polymerization initiator can have the same constitutions as in the component (a): a monofunctional (meth)acrylate, the component (b): (meth)acrylic acid, the component (c): an acrylic crosslinking agent and the component (d): a photo-radical polymerization initiator described above, respectively. Moreover, as the photo-radical polymerization initiator of component (dd), it is preferred to use the oxime ester photopolymerization initiator, the acylphosphine oxide photopolymerization initiator and the alkyl phenone photopolymerization initiator together at the same time in the same blending ratio as in the photo-radical polymerization initiator of component (d).

(12) Layer Thickness of Hollow Particle-Free Adhesive Agent Layer

The layer thickness of the hollow particle-free adhesive agent layer is preferably from 10 to 60 µm, and more preferably from 20 to 50 µm. This is because that in the range described above, the sufficient adhesiveness is obtained.

3. Production Method of Double-Sided Black Adhesive Tape

The production method of the double-sided black adhesive tape having the hollow particle-containing adhesive agent layer include steps A to C shown below.

(13) Step A

First, a surface of the hollow particle is subjected to a black pigment adhesion treatment. As the black pigment adhesion treatment, arbitrary methods can be adopted as far as the effects of the invention are not impaired. For example, mixing of the hollow particle and the black pigment using a jar mill or a stirrer, for example, a dissolver. A method of mixing the hollow particle and the black pigment using a jar mill is preferably exemplified in view of balance between safety, simplicity of the treatment operation and high efficiency of the black pigment adhesion treatment.

(14) Step B

Next, a layer is formed from a hollow particle-containing adhesive agent composition containing a photocurable type acrylic adhesive agent composition containing (a) a monofunctional (meth)acrylate, (b) (meth)acrylic acid, (c) an acrylic crosslinking agent and (d) a photo-radical polymerization initiator, and the hollow particle a surface of which is subjected to the black pigment adhesion treatment obtained in step A to form a hollow particle-containing adhesive agent composition layer. As the method of layer formation is not particularly limited, and arbitrary methods can be adopted as long as the effects of the invention are not impaired. For example, a method of coating the hollow particle-containing adhesive agent composition on an appropriate support, for example, a release film, by using a roll coater or a bar coater can be exemplified.

(15) Step C

Then, the hollow particle-containing adhesive agent composition layer formed in step B is photocured by irradiation of an electromagnetic wave, for example, ultraviolet ray to from a hollow particle-containing adhesive agent layer. Further, if desired, by cutting into a tape-like form to obtain a double-sided black adhesive tape of a single layer. In the case of using, a release base sheet is peeled off to use.

4. Information Mobile Terminal

The double-sided black adhesive tape of the invention can be preferably applied to bonding between an image display module, for example, an organic EL panel module or a liquid crystal panel module and a front panel, for example, a cover panel made of glass, plastic or the like. Specifically, it is useful to dispose on the outer peripheral edges of the image display module and the front panel opposed to each other to adhere each other, thereby obtaining an information mobile terminal. Such an information mobile terminal is also an embodiment of the invention.

EXAMPLE

Example 1

Preparation of Syrup

Into a polymerization reactor equipped with a shutter unit were charged 90 parts by mass of 2-ethylhexyl acrylate and 10 parts by mass of acrylic acid, 0.015 parts by mass of 2-hydroxy-2-methyl-1-phenylpropan-1-one (Darocure 1.173, produced by BASF Japan Ltd.) was further added thereto as a photopolymerization initiator, and the mixture was allowed to react while stirring to perform prepolymerization until the viscosity of the reaction mixture became 1,000 cps.

TABLE 1

| Component | Parts by mass |
|---|---|
| 2-Ethylhexyl acrylate | 90 |
| Acrylic acid | 10 |
| Darocure 1173 | 0.015 |

(Production of Hollow Particle-Free Adhesive Agent Film)

To 80 parts by mass of the syrup solution described above were added 20 parts by mass of 2-ethylhexyl acrylate, 0.3 parts by mass of 2-hydroxy-2-methyl-1-phenylpropan-1-one (Darocure 1173, produced by BASF Japan Ltd.) as a photopolymerization initiator, 0.2 parts by mass of hydroxypivalic acid neopentyl glycol diacrylate (KAYARAD MANDA, produced by Nippon Kayaku Co., Ltd.) as an acrylic crosslinking agent, 10 parts by mass of isostearyl acrylate (ISTA, produced by Osaka Organic Chemical Industry Ltd.) as a flexibility imparting agent and 5 parts by mass of N-isopropylacrylamide (NIPAN, produced by Kohjin Holdings Co., Ltd.), followed by mixing uniformly to prepare an ultraviolet ray curing type hollow particle-free adhesive agent composition which was liquid at room temperature.

TABLE 2

| Component | Parts by mass | Remarks |
|---|---|---|
| Syrup described above | 80 | Base |
| 2-Ethylhexyl acrylate | 20 | Diluent/Tg regulating agent |
| Darocure 1173 | 0.3 | Alkylphenone photopolymerization initiator |
| Hydroxypivalic acid neopentyl glycol diacrylate | 0.2 | Crosslinking agent |
| Isostearyl acrylate | 10 | Flexibility imparting agent |
| N-ispropylacrylamide | 5 | Adhesiveness improving agent |

Next, on a paper separator having a thickness of 150 μm a surface of which had been treated with a silicone releasing agent was coated the liquid hollow particle-free adhesive agent composition, and thereon, a transparent release film obtained by treating one side of a transparent PET film having a thickness of 50 μm with a silicone releasing agent was laminated. The laminate thus-formed was passed through between two rolls adjusted at a predetermined gap to adjust the thickness of the hollow particle-free adhesive agent composition to 0.05 mm and further irradiated with ultraviolet ray, thereby producing a hollow particle-free adhesive agent film.

(Black Pigment Adhesion Treatment of Hollow Particle)

Into a 450 ml volume glass vessel were charged 1.5 parts by mass of acrylonitrile resin hollow particles (Matsumoto Microsphere F-80SDE, produced by Matsumoto Yushi-Seiyaku Co., Ltd., average particle diameter: 20 to 40 nm) and 1.5 parts by mass of carbon black (Printex 60, produced by Orion Engineered Carbons Inc., average particle diameter: 18 nm), the glass vessel was sealed and the content was mixed by a roller type jar mill (100 rpm) for 48 hours, thereby performing the black pigment adhesion treatment of hollow particle. According to the treatment, hollow particles having carbon black adhered on their surfaces (carbon black adhesion treatment hollow particles) were obtained.

TABLE 3

| Component | Parts by mass |
| --- | --- |
| Acrylonitrile resin hollow particle | 1.5 |
| Carbon black | 1.5 |

(Production of Black Hollow Particle-Containing Substrate Containing Hollow Particles Subjected to Black Pigment Adhesion Treatment)

To 75 parts by mass of the syrup solution described above were added 25 parts by mass of 2-ethylhexyl acrylate, 0.1 part by mass of bis(2,4,6-trimethylbenzoyl)phenylphosphine oxide (Irgacure 819, produced by BASF Japan Ltd.) as a photoinitiator, 0.4 parts by mass of 2,2-dimethozy-1,2-diphenylethan-1-one (Irgacure 651, produced by BASF Japan Ltd.) as a photopolymerization initiator, 0.15 parts by mass of 1,2-octanedione, 1-[4-(phenylthio)-, 2-(O-benzoyloxime)] (Irgacure OXE 01, produced by BASF Japan Ltd.) as a photopolymerization initiator, 0.3 parts by mass of polypropylene glycol diacrylate (Aronix M-270, produced by Toagosei. Co., Ltd.) as an acrylic crosslinking agent, 10 parts by mass of ethyl carbitol acrylate (Biscoat 190, produced by Osaka Organic Chemical Industry Ltd.) as a diluent and a flexibility imparting agent and the hollow particles having carbon black adhered on their surfaces produced as described above, followed by mixing uniformly to prepare an ultraviolet ray curing type liquid black hollow particle-containing adhesive agent composition. The content of the hollow particle in the hollow particle-containing adhesive agent layer was 30% by volume.

TABLE 4

| Component | Parts by mass | Remarks |
| --- | --- | --- |
| Syrup described above | 75 | Base |
| 2-Ethylhexyl acrylate | 25 | Diluent/Tg regulating agent |
| Irgacure 819 | 0.1 | Acylphosphine oxide photopolymerization initiator |
| Irgacure 651 | 0.4 | Alkyl phenone photopolymerization initiator |
| Irgacure OXE 01 | 0.15 | Oxime ester photopolymerization initiator |
| Ethyl carbitol acrylate | 10 | Diluent/Flexibility imparting agent/Impact resistance improving agent |
| Polypropylene glycol diacrylate | 0.3 | Crosslinking agent/Flexibility imparting agent |
| Carbon black adhesion treatment hollow particle | 3.0 | |

On a paper separator having a thickness of 150 μm a surface of which had been treated with a silicone releasing agent was coated the liquid hollow particle-containing adhesive agent composition described above, and thereon, a transparent release film obtained by treating one side of a transparent PET film having a thickness of 50 μm with a silicone releasing agent was laminated. The laminate thus-formed was passed through between two rolls adjusted at a predetermined gap to adjust the thickness of the black hollow particle-containing adhesive agent composition to 0.1 mm and further irradiated with ultraviolet ray, thereby preparing a black hollow particle-containing adhesive agent substrate.

(Production of Tape Sample)

Both sides of the black hollow particle-containing adhesive agent substrate were sandwiched between the hollow particle-free adhesive agent films, followed by pressing with a load of 5 kg/cm$^2$ to produce a tape sample of double-sided black adhesive sheet having a three-layer structure.

Example 2

A tape sample was produced in the same manner as in Example 1 except for using Irgacure OXE 02 in place of Irgacure OXE 01 in Table 4 of Example 1.

Example 3

A tape sample was produced in the same manner as in Example 1 except for adding 2.5 parts by mass of urethane solid particles kneaded with carbon black (Art Pearl C-800, produced by Negami Chemical Industrial Co., Ltd.) to the black hollow particle-containing adhesive agent composition of Example 1. The content of the hollow particles in the hollow particle-containing adhesive agent layer was from 1 to 2% by volume.

Example 4

A tape sample was produced in the same manner as in Example 1 except for using glass hollow particles (Q-CEL 7040S, produced by Potters-Sailotini Co., Ltd., average particle diameter: 35 to 80 in place of the polyacrylonitrile hollow particles in Example 1.

Example 5

A tape sample was produced in the same manner as in Example 1 except for not using Irgacure OXE 01 of the photopolymerization initiator in Example 1.

Comparative Example 1

A tape sample was produced in the same manner as in Example 1 except for blending only hollow particles without adhering the carbon black in Example 1.

Comparative Example 2

A tape sample was produced in the same manner as in Example 2 except for not performing the step of coating carbon black in Example 2 and using the carbon black and the hollow particles separately.

Comparative Example 3

A tape sample was produced in the same manner as in Comparative Example 2 except for not using the hollow particles in Comparative Example 2.

Comparative Example 4

A tape sample was produced in the same manner as in Example 1 except for using a foam substrate having a thickness of 100 μm (Volara XL, produced by Sekisui Chemical Co., Ltd.) in place of the black hollow particle-containing adhesive agent substrate in Example 1.

Comparative Example 5

A tape sample (type containing only the solid particles) was produced in the same manner as in Example 3 except for eliminating the carbon black adhesion treatment hollow particles from the blend of the black hollow particle-containing adhesive agent substrate in Example 3.

Evaluation

The tape samples prepared in the examples and comparative examples were tested and evaluated with respect to "reflection density", "impact resistance", "heat loss" and "waterproof" in the manner described below. The results obtained are shown in Table 5.

(Reflection Density)

Each of the tape samples prepared in the examples and comparative examples was sandwiched between polyethylene terephthalate films each having a thickness of 25 nm and reflection density (Macbeth density) thereof was measured using a measuring apparatus (TR-924, produced by Macbeth Division of Kollmorgen (UK) Ltd.). Practically, it is desired that the reflection density is 1.5 or more.

(Impact Resistance)

Each of the tape samples prepared in the examples and comparative examples was cut into a piece of 15 mm×15 mm. Using the piece, a PMMA (polymethyl methacrylate) plate (15 mm×15 mm×4 mm) was pasted on the center of an ABS (acrylonitrile-butadiene-styrene copolymer) plate (50 mm×50 mm×4 mm to prepare a test piece. The test piece was allowed to stand in a room of normal temperature (25° C.) for 24 hours. After allowing to stand, the test piece maintained at normal temperature or 0° C. was placed on a surface plate for Erichsen test so as to contact the PMMA side with the surface plate, and a weight for Erichsen test of 300 g was dropped from a height of 30 cm on the center of the ABS side of the test piece. The presence or absence of peeling between the PMMA plate and the ABS plate was confirmed. A case where the peeling was not confirmed was evaluated as "O (good)" and a case where the peeling was confirmed was evaluated as "x (poor)".

(Heat Loss)

Each of the tape samples prepared in the examples and comparative examples was cut into a piece having a size of 10 cm square, pasted on an aluminum foil, and an initial weight (W0) was measured. The test piece was put into an oven of 135° C. for 10 minutes, taken out from the oven, allowed to stand at normal temperature for 5 minutes, and then the weight (W1) thereof was again measured. The heat loss (%) [={(W0−W1)/W0}×100] was determined. It is indicated that as the value is smaller, the curing proceeds further.

(Waterproof)

Outer peripheral edges of an ABS plate (45 mm×65 mm×1 mm) and a PMMA plate (45 mm×65 mm×1 mm) were pasted with the frame-shaped tape obtained by punching in a frame form (external dimensions: 40 mm×60 mm, width: 0.5 mm or 1 mm) to prepare a laminated plate for waterproof test. A submersion detecting seal (0.1 mm in thickness×2 mm×30 mm) (product name: Submersion Detecting Seal D-2, produced by Tokoh) had been pasted on the ABS plate opposing to the PMMA plate in a position which did not interfere with the frame-shaped tape. The laminated plate for waterproof test was submerged in a tray filled with tap water of 40° C., pressurization equivalent to the depth of 10 m was performed in this state for one hour, and then the presence or absence of bleeding in the submersion detecting seal due to water was observed A case where the bleeding was not observed was evaluated as "O (good)" and a case where the bleeding was observed was evaluated as "x (poor)".

TABLE 5

|  |  | Example | | | | | Comparative Example | | | | |
|---|---|---|---|---|---|---|---|---|---|---|---|
|  |  | 1 | 2 | 3 | 4 | 5 | 1 | 2 | 3 | 4 | 5 |
| Reflection Density |  | 1.5 | 1.5 | 1.6 | 1.5 | 1.5 | 0.2 | 0.5 | 1.6 | 1.6 | 1.4 |
| Impact Resistance | Normal Temperature | O | O | O | O | O | O | O | x | O | x |
|  | 0° C. | O | O | O | O | O | O | O | x | O | x |
| Heat Loss | % | 0.8 | 1.1 | 0.9 | 0.8 | 1.5 | 0.7 | 0.8 | 1.0 | 0.5 | 0.7 |
| Waterproof | 0.5 mm | O | O | O | O | O | O | O | x | x | O |
|  | 1 mm | O | O | O | O | O | O | O | O | O | O |

In the case of the double-sided black adhesive tapes of Examples 1 to good results in the respective test items were shown. In contrast, in the case of the double-sided black adhesive tape of Comparative Example 1, the result that the reflection density was significantly low was obtained, because black pigment was not used. In the case of the double-sided black adhesive tape of Comparative Example 2, the result that the reflection density was also low was obtained, because the hollow particles had not been subjected to the black pigment adhesion treatment. In the case of the double-sided black adhesive tape of Comparative Example 3, there was a problem in the impact resistance, because the hollow particles were not used. Also, the aggregation of carbon black was observed. In the case of Comparative Example 4, the problem in the waterproof occurred, particularly, when the width of the tape became narrower, because the foam substrate in which the presence of voids was unavoidable was used in place of the black hollow particle-containing adhesive agent substrate. In the case of the double-sided black adhesive tape of Comparative Example 5, there was a problem in the impact resistance, because the black hollow particles were not contained although the black solid particles were contained.

INDUSTRIAL APPLICABILITY

The double-sided black adhesive tape of the invention contains hollow particles in the adhesive agent layer. Therefore, the double-sided black adhesive tape has good waterproof and impact resistance. Moreover, the hollow particle is subjected to a black pigment adhesion treatment on the surface thereof. Therefore, the light diffusion capability of the hollow particle is greatly suppressed, the photocurable type acrylic resin composition can be sufficiently blackened, and since the black pigment is not uniformly dispersed in the photocurable type acrylic resin composition, the photocurable type acrylic resin composition can be sufficiently photocured. Accordingly, the double-sided black adhesive tape of the invention is useful in the case where a transparent protective front panel is pasted on an image display module of portable information terminal, for example, a smart phone.

While the invention has been described in detail and by reference to specific embodiments, it is apparent to those skilled in the art that it is possible to add various alterations and modifications insofar as the alterations and modifications do not deviate from the spirit and the scope of the invention.

This application is based on a Japanese patent application filed on Mar. 5, 2014 (Japanese Patent Application No. 2014-042642) and a Japanese patent application filed on Mar. 3, 2015 (Japanese Patent Application No. 2015-041048), and the contents thereof are incorporated herein by reference.

The invention claimed is:

1. A double-sided black adhesive tape having a hollow particle-containing adhesive agent layer, wherein a surface of the hollow particle is coated with a layer of black pigment by being subjected to a black pigment adhesion treatment, the hollow particle-containing adhesive agent layer contains a black pigment-including resin particle including a black pigment having a particle volume average particle diameter of 1 to 20 μm, and a content of the black pigment having a particle volume average particle diameter of 1 to 20 μm is from 0.25 to 1.0% by mass to the black pigment-including resin particle,
   wherein the hollow particle-containing adhesive agent layer is a layer obtained by forming a layer from a hollow particle-containing adhesive agent composition containing a photocurable type acrylic adhesive agent composition containing (a) a monofunctional (meth)acrylate, (b) (meth)acrylic acid, (c) an acrylic crosslinking agent and (d) a photo-radical polymerization initiator, and a hollow particle a surface of which is subjected to a black pigment adhesion treatment, and photopolymerizing the layer;
   wherein on one side or both sides of the hollow particle-containing adhesive agent layer is provided a hollow particle-free adhesive agent layer obtained by forming a layer from a photocurable type hollow particle-free adhesive agent composition containing a photocurable type acrylic adhesive agent composition containing (aa) a monofunctional (meth)acrylate, (bb) (meth) acrylic acid, (cc) an acrylic crosslinking agent and (dd) a photo-radical polymerization initiator, and photopolymerizing the layer;
   wherein (c) the acrylic crosslinking agent and (cc) the acrylic crosslinking agent are respectively at least one selected from the group consisting of neopentyl glycol di(meth)acrylate, hydroxypivalic acid neopentyl glycol di(meth)acrylate, polypropylene glycol di(meth)acrylate, nonanediol di(meth)acrylate, 1,4-butanediol di(meth)acrylate, polyethylene glycol di(meth)acrylate and EO-modified polypropylene glycol di(meth)acrylate;
   wherein (c) the acrylic crosslinking agent is different from (cc) the acrylic crosslinking agent;
   wherein the monofunctional (meth)acrylate (a) is at least one selected from the group consisting of 2-ethylhexyl acrylate, butyl acrylate, isooctyl acrylate, isostearyl acrylate and ethyl carbitol acrylate;
   wherein the monofunctional (meth)acrylate (aa) is at least one selected from the group consisting of 2-ethylhexyl acrylate, butyl acrylate, isooctyl acrylate, isostearyl acrylate and ethyl carbitol acrylate;
   wherein the hollow particle-containing adhesive agent composition further contains ethyl carbitol acrylate as a flexibility imparting agent; and
   wherein the photocurable type hollow particle-free adhesive agent composition further contains isostearyl acrylate as a flexibility imparting agent.

2. The double-sided black adhesive tape as claimed in claim 1, wherein an average particle diameter of the hollow particle is from 20 to 40 μm, and an average particle diameter of the black pigment provided on the surface of the hollow particle by the black pigment adhesion treatment is from 10 to 30 nm.

3. The double-sided black adhesive tape as claimed in claim 1, wherein the hollow particle is a polyacrylonitrile hollow particle.

4. The double-sided black adhesive tape as claimed in claim 1, wherein the black pigment of the layer coated on the surface of the hollow particle is carbon black.

5. The double-sided black adhesive tape as claimed in claim 1, wherein a content of the hollow particle in the hollow particle-containing adhesive agent layer is from 20 to 40% by volume.

6. The double-sided black adhesive tape as claimed in claim 1, wherein the hollow particle-containing adhesive agent layer contains the black pigment-including resin particle in an amount of 1 to 8% by volume.

7. The double-sided black adhesive tape as claimed in claim 1, wherein the (meth)acrylic acid (b) is acrylic acid or methacrylic acid, the acrylic crosslinking agent (c) is at least one selected from the group consisting of neopentyl glycol di(meth)acrylate, hydroxypivalic acid neopentyl glycol di(meth)acrylate, polypropylene glycol di(meth)acrylate, nonanediol di(meth)acrylate, 1,4-butanediol di(meth)acrylate, polyethylene glycol di(meth)acrylate and EO-modified polypropylene glycol di(meth)acrylate, and the photo-radical polymerization initiator (d) is at least one selected from the group consisting of an oxime ester photopolymerization initiator, an acylphosphine oxide photopolymerization initiator and an alkyl phenone photopolymerization initiator.

8. The double-sided black adhesive tape as claimed in claim 7, wherein the photocurable type acrylic adhesive agent composition contains from 2 to 20 parts by mass of the (meth)acrylic acid (b), from 0.1 to 1.0 part by mass of the acrylic crosslinking agent (c) and from 0.1 to 1.0 part by mass of the photo-radical polymerization initiator (d), based on 100 parts by mass of the monofunctional (meth)acrylate (a).

9. The double-sided black adhesive tape as claimed in claim 7, wherein the photo-radical polymerization initiator (d) includes the oxime ester photopolymerization initiator, the acylphosphine oxide photopolymerization initiator and the alkyl phenone photopolymerization initiator in a ratio of (0.1 to 4):(0.1 to 2):(1 to 8) on a weight basis.

10. The double-sided black adhesive tape as claimed in claim 1, wherein a layer thickness of the hollow particle-containing adhesive agent layer is from 60 to 140 μm.

11. The double-sided black adhesive tape as claimed in claim 1, wherein the (meth)acrylic acid (bb) is acrylic acid or methacrylic acid, the acrylic crosslinking agent (cc) is at least one selected from the group consisting of neopentyl glycol di(meth)acrylate, hydroxypivalic acid neopentyl glycol di(meth)acrylate, polypropylene glycol di(meth)acrylate, nonanediol di(meth)acrylate, 1,4-butanediol di(meth) acrylate, polyethylene glycol di(meth)acrylate and EO-modified polypropylene glycol di(meth)acrylate, and the photo-radical polymerization initiator (dd) is at least one selected from the group consisting of an oxime ester photopolymerization initiator, an acylphosphine oxide photopolymerization initiator and an alkyl phenone photopolymerization initiator.

12. The double-sided black adhesive tape as claimed in claim 11, wherein the photo-radical polymerization initiator (dd) includes the oxime ester photopolymerization initiator, the acylphosphine oxide photopolymerization initiator and the alkyl phenone photopolymerization initiator in a ratio of (0.1 to 4):(0.1 to 2):(0.4 to 8) on a weight basis.

13. The double-sided black adhesive tape as claimed in claim 1, wherein the hollow particle-free adhesive agent composition contains from 2 to 20 parts by mass of the (meth)acrylic acid (bb), from 0.1 to 1.0 part by mass of the acrylic crosslinking agent (cc) and from 0.1 to 1.0 part by mass of the photo-radical polymerization initiator (dd), based on 100 parts by mass of the monofunctional (meth)acrylate (aa).

14. The double-sided black adhesive tape as claimed in claim 1, wherein a layer thickness of the hollow particle-free adhesive agent layer is from 10 to 60 µm.

* * * * *